July 30, 1935.  J. BIJUR  2,009,430
LUBRICATION
Filed July 2, 1929   5 Sheets-Sheet 1
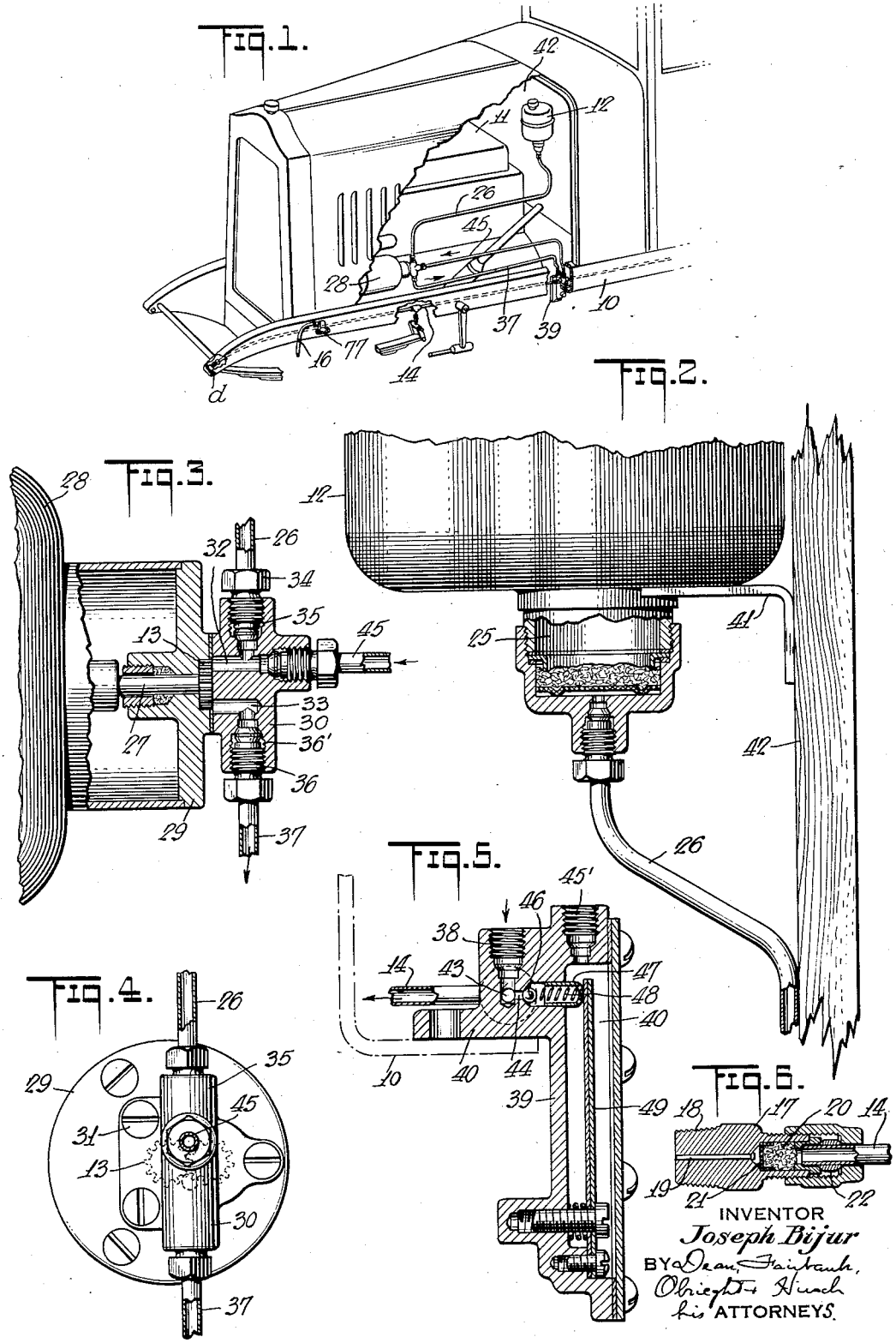
INVENTOR
Joseph Bijur
BY
his ATTORNEYS.

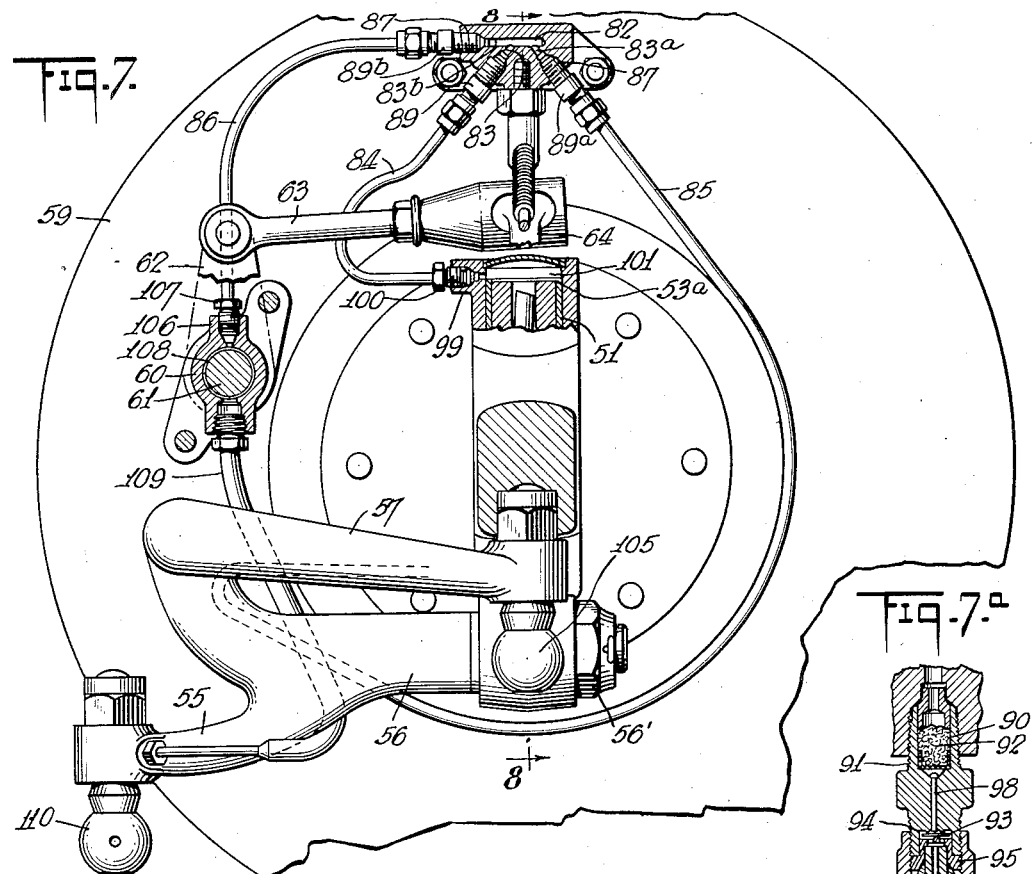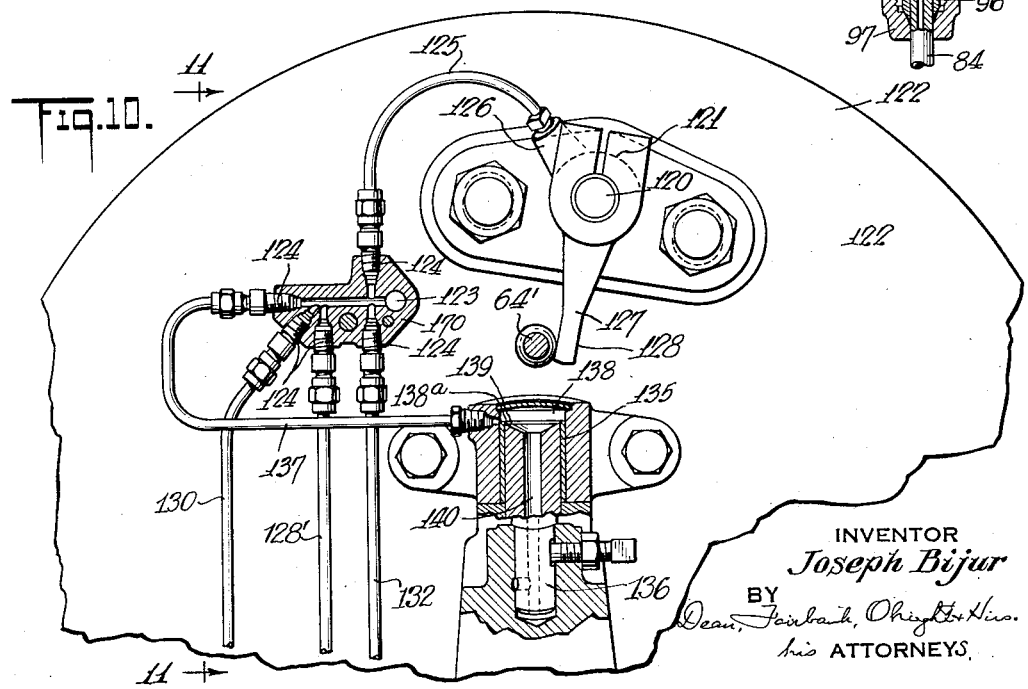

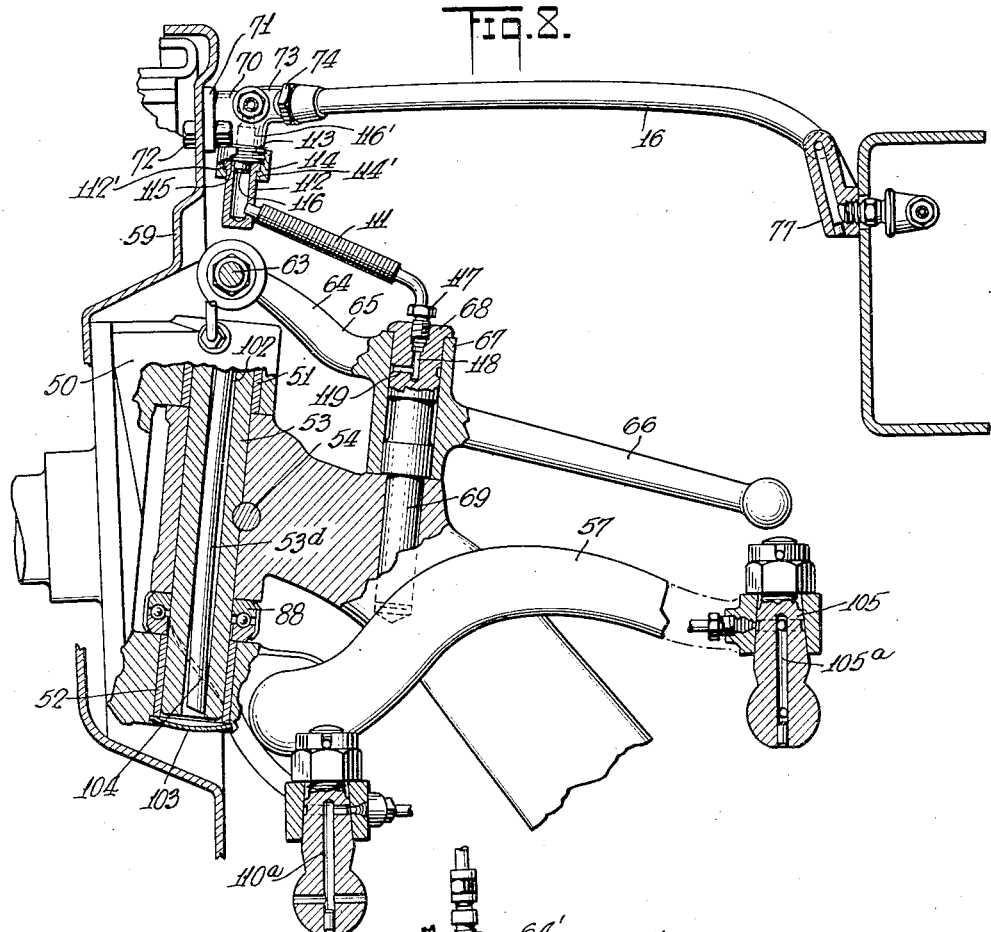

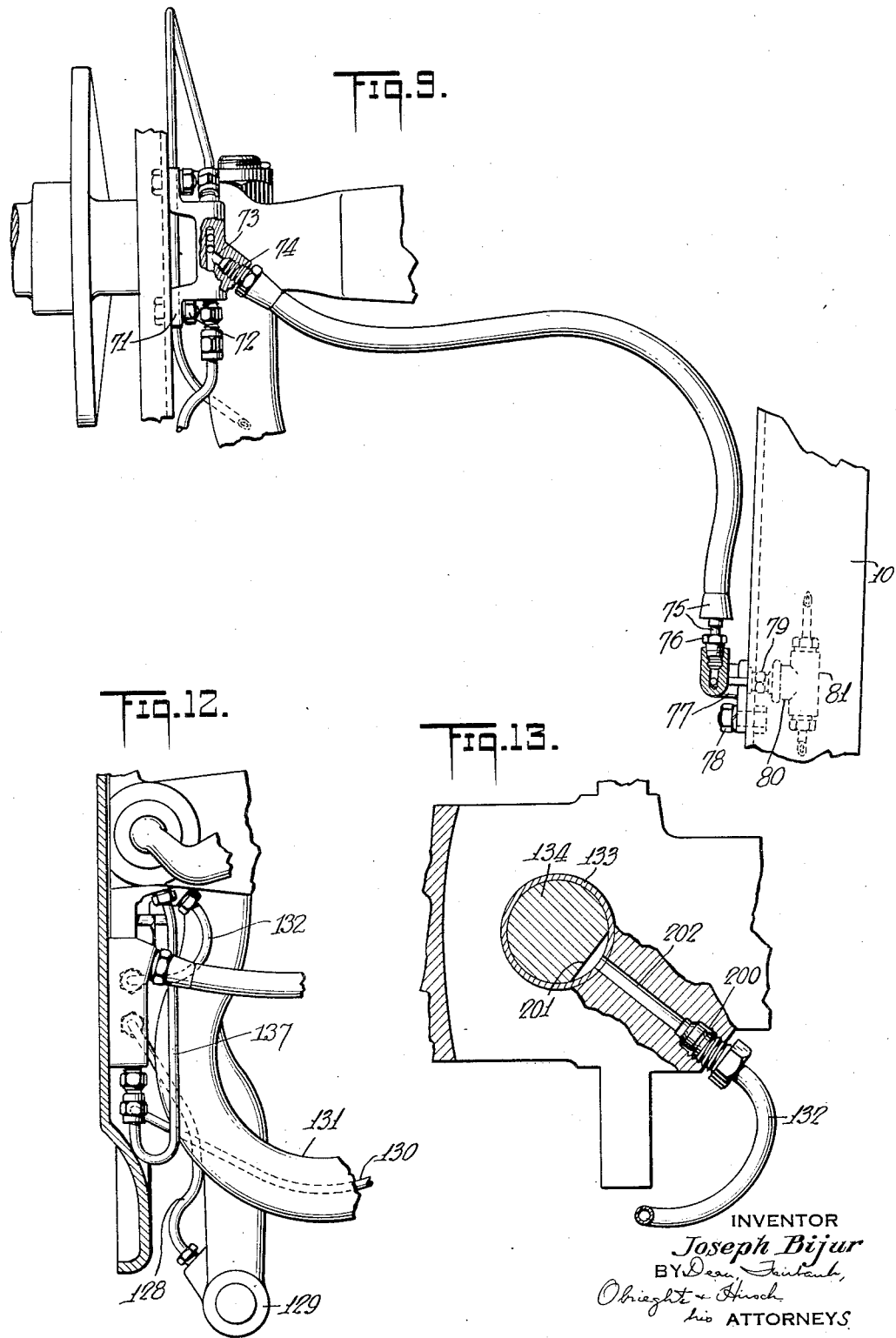

July 30, 1935. J. BIJUR 2,009,430
LUBRICATION
Filed July 2, 1929 5 Sheets-Sheet 5
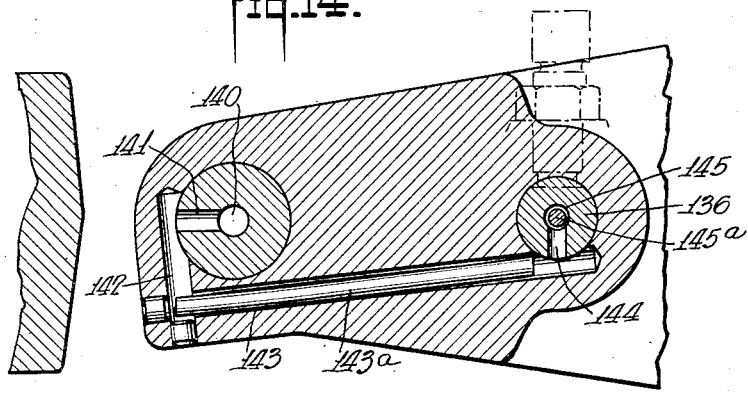
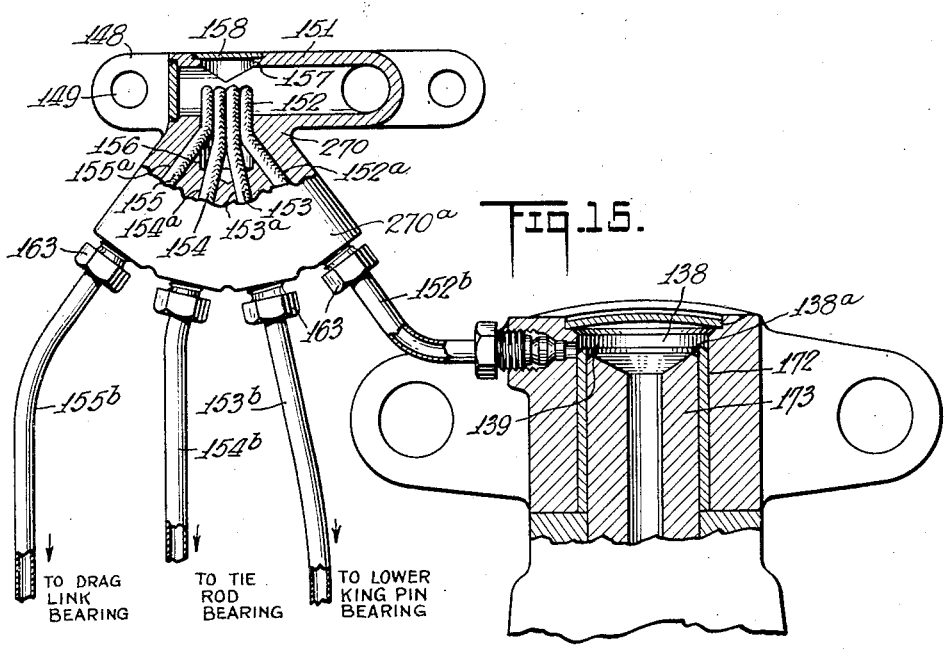
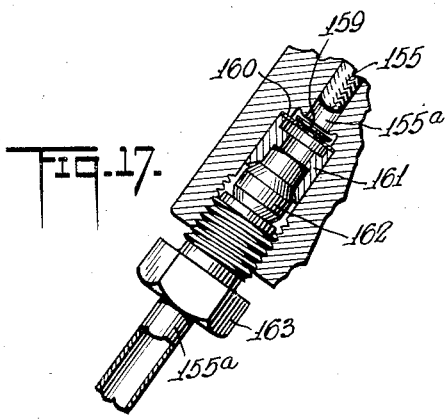
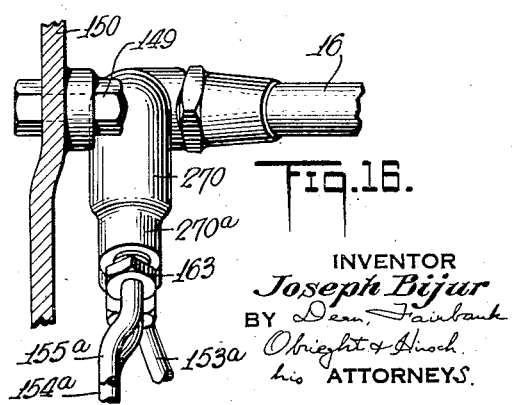
INVENTOR
Joseph Bijur
BY
his ATTORNEYS Patented July 30, 1935

2,009,430

UNITED STATES PATENT OFFICE 2,009,430

LUBRICATION

Joseph Bijur, New York, N. Y., assignor to Auto Research Corporation, a corporation of Delaware Application July 2, 1929, Serial No. 375,366

41 Claims. (Cl. 184—7)

My present invention relates primarily to centralized lubrication and will be illustratively described in connection with the lubrication of the bearings of an automobile chassis, as for example with the lubrication of bearings on the steering knuckle and/or other elements swivelled to or otherwise moving in relation to the vehicle body carrying the central source of lubricant.

In its most specialized application the invention relates to continuous feed systems, that is, to systems feeding lubricant substantially continuously throughout operation through distributing conduits having flow control restriction outlets of the drip plug type.

An object of the invention is to provide a system of this character operative to supply lubricant to various groups of bearings, as for example on the steering knuckle of an automobile front axle, from a source on the vehicle frame without regard to the tightness or the relative levels of the various bearings in said groups.

Another object is to accomplish this result without using large bore conduits, or flapping conduits while excluding dirt and dust from the entire flow system.

Another object is to provide a system of this character which entirely obviates the danger of siphoning between flow outlets at different levels and which moreover avoids overoiling or underoiling of any bearing.

Another object is to provide a continuous feed system operating to deliver lubricant at an extremely slow rate to various outlying bearings and to render the uniformity and correct proportioning of this slow feed wholly independent of the position of the bearing relative to the main chassis structure.

Bearing in mind that each of the bearings to be lubricated requires but a few drops of oil for many hours of running, the rate of continuous feed, whether caused by gravity or by positive impelling pressure, must be extremely slow to avoid excessive over-lubrication, especially when the oil is relatively fluid in summer. Accordingly the propulsive pressure of the oil from the source to the bearings must be extremely low, possibly of the order of a few ounces. This renders unfeasible the use of spring seated, lubricant pressure operated valves in the various conduits, conduit branches or drip plugs. With the omission of such valves, however, the lower outlets are apt to leak oil, particularly in the case of an automobile chassis while the vehicle is at rest, and the normal flow inducing means is ineffective, since at this time, one or more of the outlets at a higher level might serve as vents to permit draining.

With difference in the levels of the bearings much of the lubricant required for bearings, if fed across the swivel bearing thereof is apt to leak therefrom without reaching the bearing surface for which it is intended.

This is particularly true when a column of oil must be maintained beyond the crevice to supply bearings at higher level than the crevice.

According to the present invention most or all of the drip plug control elements for the various bearings are disposed at nearly a common level. The drip plugs or other flow restrictions means governing the supply of lubricant to the various bearings are preferably disposed in a cluster upon means rigid with and above the bearings and accordingly at nearly the same level as the various drip plugs on the rest of the system.

In the case of a knuckle of an automotive vehicle, individual down flow conduits each controlled by its own drip plug, which may be valveless, lead lubricant along the knuckle structure to the various knuckle bearings and the bearings of the other front wheel control appurtenances, such for instance, as those of the brake operating mechanism. Where, as is commonly the case, the bearings on the knuckle are at different levels and connected to the cluster by pipe legs at different lengths siphoning is negligible since two drip plugs or flow restrictions in series intervene in the siphoning pipe connection between bearings. Suction seated flap valves may be provided however at the various drip plugs to positively inhibit siphoning. In some cases it is feasible to feed some one bearing at lower level by lubricant flow past a swivel crack, particularly through the loaded face thereof. I eliminate any condition where a plurality of higher bearings or a considerable number of bearings at any level are dependent for lubricant supply upon a stream of lubricant flowing upwardly or in any direction beyond and across a leaky swivel joint.

The lubricant is preferably conveyed from the main frame to the cluster on the steering knuckle or other relatively moving structure part through a conduit or hose bridging from the frame and either flexible or otherwise capable of accommodating the various steering and other movements of said knuckle relative to the frame of the vehicle.

The invention may be more fully understood from the following description in connection with the accompanying drawings, wherein:

Fig. 1 is a fragmentary perspective view of a vehicle equipped with my improved system, the hood being partially broken away to expose the lubricant supply, feed and pressure control mechanism thereunder, Fig. 2 is an enlarged detail, partly in section and partly in elevation through the lower end of the reservoir, Fig. 3 is a vertical view in section through the pump, Fig. 4 is an end elevation of the pump, Fig. 5 is a detail in vertical section through a thermostatic pressure control for the system, Fig. 6 is a sectional view of one of the drip plugs, Fig. 7 is an inside elevational view of a steering wheel knuckle, parts being shown in section and broken away, Fig. 7a is a detail of a reverse drip plug used at the cluster fitting, Fig. 7, Fig. 8 is a transverse sectional view through the knuckle taken approximately on the line 8—8 of Fig. 7, Fig. 9 is a plan view of the knuckle and the supply conduit thereto with parts broken away and in section, Fig. 10 is an offset sectional view showing the upper portion of the king pin in section and the lower part of the brake post generally similar to Fig. 7, but more fragmentary and illustrating a modification, Fig. 11 is a view partly in section and partly in elevation taken approximately on the line 11—11 of Fig. 10, Fig. 12 is a plan view of the embodiment of Fig. 10, Fig. 13 is a transverse sectional detail on the line 13—13 of Fig. 11, Fig. 14 is a transverse sectional view on the line 14—14 of Fig. 11.

Fig. 15 is a fragmentary view partly in section and partly in elevation and on a larger scale of a modified form of apparatus, Fig. 16 is a fragmentary sectional side view of said modification, and Fig. 17 is a sectional detail through one of the anti-siphoning flap valves.

Referring now to Figs. 1 to 5 of the drawings there is shown a conventional chassis layout including a frame 10, with an engine 11 thereon and a lubricant tank 12 (fixed to a bracket 41 on dash board 42). A distributing conduit system 14 extending along the chassis frame 10 is supplied from the tank by means hereafter described. At or near various bearings, the distributing system has outlets such as the drip plugs d, the details of one of which are shown in Fig. 6. A flexible conduit 16 bridges from one of the main conduits 14 on the channel frame to the front knuckle and serves to supply various knuckle bearings as will be more fully described below in connection with the specific embodiments shown in the other figures of the drawings.

One of the drip plugs shown in detail in Fig. 6 may conveniently comprise a fitting 17 with a threaded end 18 for application at the bearing. High resistance to flow is determined by a pin 19 nearly filling a longitudinal bore of the fitting. A strainer plug 20 of wool felt is provided at the inlet end of the fitting and backed by a wire mesh cap 21 to intercept solid particles which might otherwise reach the restriction crevice determined by the pin. A suitable compression coupling indicated generally at 22 serves to connect the end of one of the conduits 14 to the drip plug. The diameter of the pin 19 determines the rating of the fitting and in operation the drip plugs proportion the distribution of lubricant to the various bearings.

A desirable form of apparatus is illustratively shown in Figs. 1 to 5 for maintaining a continuous slow feed of lubricant into the conduit system during running of the vehicle. For purposes of the present invention any of a wide variety of apparatus for maintaining the desired slow, continuous, feed might be utilized.

Oil from the reservoir 12 flows through a filter chamber 25 at the bottom of the reservoir into a pipe 26 which conveys it to the inlet side of a gear pump 13, driven from the engine, illustratively from the end of the shaft 27 of generator 28. The gears 13 work in countersunk recesses in a casting 29 on the end of the generator, and which provides a bearing for the shaft 27. Pump inlets and outlets are provided in a second casting 30, screwed or otherwise secured at 31 in liquid-tight relationship against the outer face of casting 29 and in such a manner that the pump inlet and outlet passageways 32 and 33 are brought into proper relationship with the gears of the pump. A compression coupling 34 secures the lower end of the pipe 26 with respect to a socket 35 in the casting 30 which socket at its lower end intersects the bore 32. The dead-end outlet bore 33 is transversely tapped by a socket 36' in which the outlet pipe 37 is secured by compression coupling 36.

By reason of the fact that the viscosity of oil rises enormously with fall of temperature within winter and summer ranges, thermostatic means is provided to correspondingly control the effective pressure of the pump 13 to attain approximate uniformity of oil feed to the line at all temperatures of use.

The pipe 37 instead of feeding direct to the line, delivers into an inlet 38 formed in the cast wall 39 of a thermostat casting. Casting 39 may conveniently provide a ledge portion 40 to rest upon and be bolted to the lower lip of the chassis frame 10 where it is exposed to atmospheric temperature.

The oil entering inlet socket 38 flows into a transverse passageway 43 from whence part of it passes into the main conduit system 14 and most of it passes through the valve controlled by-pass opening 44 into the interior of the thermostat casing whence it is returned by way of outlet 45' through by-pass 45 to the inlet passageway 32 of the pump.

A spring-opposed ball check valve 46 controls the by-pass 44 and a perforated thimble 47 backing the valve spring 48 and regulating the pressure on the valve is directly controlled by a thermostat 49 here illustrated as of the bi-metallic plate type. The thermostat automatically increases the spring load on the by-pass valve 46 in cold weather and thereby permits a correspondingly higher pressure to build up, to compensate for increase in viscosity of the oil in the cold weather.

The thermostatic by-pass valve pressure is so adjusted as to cause lubricant to be fed into the conduit system at the extremely slow rate necessary to meet the small lubricant requirements of the chassis without excessive overflow and the feed takes place continuously as long as the engine is running.

Referring now to Figs. 7, 8 and 9 of the drawings there is shown means for supplying lubricant to a steering knuckle and all of its associated bearings. In these figures illustratively the steering knuckle embodies a brake of the axle brake post type.

The knuckle, which in itself is not my invention, has a clevis 50, the upper and lower jaws of which carry bearing bushings 51 and 52 respectively, encircling the protruding upper and lower ends of the king pin 53, the latter being pinned or keyed at 54 into the axle eye. The knuckle is shown with a tie rod arm 55 the eye of which mounts the ball stud 110, and a steering or drag link arm 57, the eye of which mounts the ball stud 105. Illustratively the tie rod and drag link arms are formed from a unitary forging with a support boss 56 secured at 56' to the knuckle.

The knuckle is shown with a brake shield 59 through a fixed bearing 60 of which extends a brake cam operating rock shaft 61. The rock shaft 61 is operated from an upstanding arm 62 connected by a link 63 with the outer end 64 of a lever 65 actuated from its inner end 66 and pivoted at its hub 67 about the upstanding end of a brake post 68 which is affixed into the axle at 69.

To lubricate the various bearings on the knuckle from the frame, a special junction or dividing fitting 70 is provided, the extension lugs 71 of which are bolted at 72 to the upper part of the brake shield 59 at a level higher than the various knuckle bearings and preferably at the approximate level of the various drip plugs on the chassis frame. The face of the junction has a protruding integral socket 73 preferably substantially directly aligned with the axis of the king pin 53. In this socket is affixed the outlet or ferrule end 74 of the flexible rubber composition pressure transmitting bridging hose 16. At the inlet end of hose 16 is a ferrule 75 connected by a compression coupling 76 to a fitting 77 on the chassis frame. This fitting is preferably bolted at 78 to the channel frame bar 10 and is supplied from a connecting adapter 79 mounting the leg 80 of a T fitting 81 in one of the main conduits 14 on the channel frame.

The junction fitting has a system of bores supplied from the inlet socket 73 thereof, and including the dead end longitudinal bore 82 and a plurality of radiating bores 83, 83ª, 83ᵇ which bores serve for application of the inlet ends of the respective tail pipes 84, 85 and 86, each leading to a corresponding bearing on the knuckle. In the enlarged sockets 87 at the outer ends of bores 83, 83ª, 83ᵇ are disposed restriction fittings 89 preferably each in the form of a reverse drip plug, that is, a drip plug mounted in the supply element and feeding to a delivery pipe. Inasmuch as the specific construction of these fittings is not in itself material to the invention claimed herein it is briefly noted that each of said fittings (Fig. 7ª) has a socket 90 in its mounting end 91 accommodating a felt strainer 92. Preferably a flap valve or suction seated valve 93 is lodged in the outlet socket 94 of the fitting and retained in position by a cap piece 95 which serves as a reaction member for the compression coupling sleeve 96 tightened about the tail pipe 84, 85 or 86 by its nut 97. The flow restriction pin 98 is lodged in a longitudinal axial bore in the fitting between the strainer 92 and the flap valve 93.

As shown in the drawings, tail pipe 84 leads from the corresponding drip plug 89 to a boss 99 on the upper end of the knuckle clevis 50 to which it is attached by coupling 100. The pipe 84 thus feeds the cavity 101 above the king pin 53, fitting trough 53ª about the top of the king pin from which it drains to the upper bearing bushing 51. Part of the lubricant overflowing from the trough passes downward through an axial bore 102 through the king pin into a well therebelow formed by lower cap 103 and lower bearing bushing 52 of clevis 50.

The lubricant welling up is distributed by spiral groove 104 around the lower clevis bearing and into the thrust bearing 88. If desired, a large pin 53ᵈ may substantially fill the king pin bore and reduce the volume thereof (Fig. 8).

From the socket 83ª and its reverse drip plug 89ª the tail pipe 85 leads along the knuckle structure and along the drag link or steering arm 57 to deliver into a system of bores 105ª (the details of which are not material to the invention herein claimed and, therefore, not described) to lubricate the drag link bearing 105. From the third reverse drip plug 89ᵇ in the socket 83ᵇ another tail pipe 86 leads to an inlet socket 106 in the bearing 60 into which it is secured by a compression coupling nut 107. The bearing 60 has a peripheral groove 108 thereabout from which lubricant passes laterally to lubricate the length of the bearing and excess drains downward through a pipe 109 leading to the system of bores 110ª in the tie rod ball stud 110. To preclude air blocking, the bore of pipe 109 is made of relatively large diameter for the greater part of the length thereof as in my prior British Patent No. 254,655.

To lubricate the bearing surface of the brake stud 68, which is near the junction fitting, a short flexible pipe 111 is connected therebetween. This pipe may comprise a rubber lining with a reinforcing hose thereabout. The inlet end of the lining is soldered into the lower part of a thimble 112 secured to a nipple 113 on the lower part of the junction fitting by means of a cap 114, the inturned flange 114' of which overlaps the outward rim 112' of the thimble. A drip plug 116 of the cartridge type is friction fitted into a corresponding socket 116' in the junction fitting. The outlet end of the flexible pipe 111 is connected by a coupling 117 into the upper end of the brake stud 68, the latter having a short axial bore 118 communicating with the radial bore 119 near the upper part of the brake lever hub 67.

In operation lubricant propelled by the gear pump 13 or other source of continuous pressure is transmitted through the conduit system 14, 16 in parallel to the various drip plugs at the outlets thereof each of which feeds at its characteristic rate. The tail pipes 84, 85, 86 and 111 are preferably of small diameter of the order of ⅛" bore or less, so small in fact, as to maintain the lubricant therein by capillarity. Accordingly as the lubricant is propelled under pressure past the various drip plugs, corresponding emission to the bearings occurs at the outlet ends of the tail pipes.

The pipe 109 which is fed from the bearing 60 being of large diameter does not fill up but the oil trickles down along its wall so that the tension of a column of liquid tending to drain the bearing 60 is obviated.

It will be understood that where it is desired not to lubricate the brake cam shaft bearing 60 of a pipe corresponding to pipe 86, but of greater length, may extend direct from the drip plug 89 to the tie rod ball stud 110. This pipe, like pipes 84 and 85 may be of small bore and normally filled with oil.

Siphoning, is avoided by the present construction, notwithstanding the difference in level between bearings 51 and 105 for instance, because the tension due to the column of oil in pipe 85 acts through the restrictions of two drip plugs 89ᵃ and 89 in series so that even without the flap valves 93 siphoning would not be troublesome. The presence of the flap valve 93 in drip plug 89 however, entirely inhibits such action.

In the embodiment of Figs. 10 to 14 there is shown a generally similar knuckle lubricating system in which, however, the brake cam operating rock shaft 120 is in a bearing 121 on the brake shield 122 and at a level well above the king pin and of the junction fitting 170.

The rock shaft 120 has an arm 127, the lower flattened end 128 of which is urged by the brake release spring (not shown) against the outer ball end 64' of lever 65' which is similar to lever 65 shown in Fig. 8. While lever 64' may be mounted on a brake post identical with that shown in Fig. 8, the post of Fig. 11 is illustratively shown with a modified lubricant duct arrangement which will be fully described below.

As in Fig. 7 the junction fitting is supplied from an inlet socket 123 carrying the outer end of the flexible hose 16' and it has a system of bores therein leading to the respective reverse drip plugs 124. One of these drip plugs preferably in the top of the junction fitting leads through an upwardly extending pipe length 125 into the boss 126 on the cam shaft bearing 121. Another one of the drip plugs 124 leads through pipe 128' to tie rod bearing 129. A third drip plug 124 leads by way of pipe 130 along the steering arm 131 to the drag link bearing (not shown) and a fourth by way of pipe 132 conveys lubricant to the lower pivot bearing 133 of the king pin 134. As best seen in Fig. 13 the outlet end of pipe 132 is coupled into a socket 200 at the outer end of a radial bore 202 in the lower knuckle clevis, which bore intersects bushing 133 and delivers to a flat 201 at the lower end of the king pin. The fifth drip plug supplies lubricant according to the present embodiment both to the upper pivot bearing 135 of the king pin 134 and to the bearing of the brake post 136. To this end this reverse drip plug leads by way of pipe length 137 to the chamber 138 in the upper end of the upper knuckle clevis. Lubricant flows thus from channel or trough 138ᵃ to the upper bushing and overflowing the annular dividing ridge 139 drains downwardly through a short axial bore 140 in the king pin 134 and through a radial bore 141 (see Fig. 14) at the loaded side of the king pin into a bore 142, in the axle, tangential to the king pin, thence flowing to the brake post through a longitudinal bore 143 in the axle web said bore extending tangentially of the brake post 136 and feeding thereinto through a radial bore 144 in the loaded side of the latter. The brake post has an axial bore 145 communicating at its upper end with a diametric bore 146 for delivering the lubricant to the brake post bearing 147. The longitudinal bore 143 and the axial bore 145 similarly to the king pin bores of Figs. 7 and 14 are preferably partially filled with rods 143ᵃ and 145ᵃ respectively, to reduce the effective volume of said passages. Thus the continuous feed of lubricant will merely advance the column of lubricant filling the small-volume generally U shaped passage determined by the king pin bore 140, the longitudinal bore 143 and the axle brake post bore 145.

The embodiment of Figs. 15 to 17 is generically similar to those of Figs. 7 to 14 in that it dispenses with the use of isolated drip plugs at different levels. In this case the junction fitting 270 comprises a generally horizontal pipe portion 151 with lugs 148 at the ends thereof bolted as at 149 to the brake shield 150. Under the tubular inlet portion 151 the fitting has a fan shaped outlet portion 270ᵃ with converging radial bores 152ᵃ, 153ᵃ, 154ᵃ, 155ᵃ entering a common terminal socket 156 at their upper ends. Through the respective converging bores are drawn tight-fitting highly compacted wicks 152, 153, 154 and 155 and the upper ends of these wicks are pressed into close contiguity with respect to each other in the common socket 156 and protrude as shown, above said socket. Preferably the junction fitting has an aperture 157 in its upper part to facilitate insertion of the wicks, said aperture being sealed by a closure disk 158. In the embodiment illustratively shown, the outlet end of each of the bores 152ᵃ to 155ᵃ has an enlarged socket for accommodating a flap valve 159 (Fig. 17) the movement of which is confined by a disk 160 retained in place by a reaction collar 161 against which the upper end of the corresponding tail pipe 152ᵃ, 153ᵃ, 154ᵃ or 155ᵃ as the case may be is bottomed. Each reaction collar 161 also serves as a stop for the compression coupling sleeve 162 which is tightened about the corresponding tail pipe by forcing home the associated coupling nut 163.

In the embodiment illustratively shown the wicks 152, 153, 154 and 155 feed respectively through their corresponding tail pipes 152ᵇ, 153ᵇ, 154ᵇ and 155ᵇ to the upper bearing 172 of the king pin 173 and, as indicated by legends, to the lower bearing of the king pin, the tie rod bearing, and the drag link bearing.

It will be understood that the restriction wicks 152, 153, 154 and 155 offer high resistance to flow under pressure. It will also be understood that the various small bore pipes 152ᵇ, 153ᵇ, 154ᵇ and 155ᵇ are normally maintained filled with lubricant by capillarity. In operation the lubricant slowly fed under pressure through the flexible bridging conduit continually reaches the bundle of wick ends which are always wet thereby and the pressure is transmitted through the lengths of the respective wicks which govern flow division and cause corresponding advance of the columns of oil in the respective tail pipes, with corresponding emission to the various knuckle bearings.

In this embodiment as in those above described, reverse flow or siphoning from a higher through a lower bearing is substantially prevented by the resistance of two of the compacted wicks in series and is entirely prevented by the provision of the flap valves 159.

By the terms control, adjacent, subsidiary, carried, and/or associated bearings, as utilized in the accompanying claims is included the pivotal control bearings such as the upper and lower king pin bearing, and also the thrust bearing, which are located internally of the knuckle; the steering actuating controlling bearings such as the drag link and tie rod bearings which are located externally of the knuckle; and other bearings associated with, positioned about, or located adjacent to the knuckle which are adapted to receive lubricant from the same source that supplies said knuckle bearings proper.

The lubrication installations of the present invention may be applied to the lubrication of other than chassis bearings or to the lubrication of other chassis bearings than steering knuckle bearings.

The thermostatically controlled system shown in Figs. 3, 4 and 5 and the cluster arrangements of Figs. 7, 10 and 15 are broadly applicable to lubricating installations other than chassis systems.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. In a motor vehicle, the combination of a chassis, a supporting element connected to said chassis, a knuckle with associated bearings, pivoted thereon, a king pin forming a pivotal mount therebetween, a junction fitting fixedly positioned in respect to said knuckle near the upper part thereof above and removed from the upper end of the king pin, a flow line bridging from said chassis to said junction, said junction having an inlet from said bridging conduit, and a plurality of conduits leading from said junction and in communication with said inlet, and leading to various knuckle bearings.

2. In a motor vehicle, the combination of a chassis, a supporting element connected to said chassis, a knuckle with associated bearings, pivoted thereon, a junction fitting fixedly positioned in respect to said knuckle near the upper part thereof, a flow line bridging from said chassis to said junction, said junction having an inlet from said bridging conduit, and a plurality of conduits leading from said junction and in communication with said inlet, and leading to various knuckle bearings, each conduit having a flow control element therein.

3. In a motor vehicle, the combination of a chassis frame, an axle, a knuckle with associated bearings, pivoted thereon, a junction fitting fixedly positioned in respect to said knuckle near the upper part thereof, a flow line bridging from said chassis to said junction, said junction having an inlet from said bridging conduit, a plurality of conduits leading from said junction and in communication with said inlet, and leading to various knuckle bearings, each conduit having a flow control element therein, substantially at the junction fitting.

4. In a motor vehicle, the combination of a chassis frame, an axle, a knuckle with associated bearings pivoted thereon, a junction fitting fixedly positioned in respect to said knuckle near the upper part thereof, a flow line bridging from said chassis to said junction, said junction having an inlet from said bridging conduit, a plurality of conduits leading from said junction and in communication with said inlet, and leading to various knuckle bearings, each conduit having a flow control element therein, substantially at the junction fitting, flow through the respective conduits being in parallel and at rates proportioned by the flow control fittings.

5. In a motor vehicle, the combination of a chassis frame, an axle, a knuckle with associated bearings, pivoted thereon, a junction fitting fixedly positioned in respect to said knuckle near the upper part thereof, a flow line bridging from said chassis to said junction, said junction having an inlet from said bridging conduit, a plurality of conduits leading from said junction and in communication with said inlet, and leading to various knuckle bearings, and means preventing siphoning from one of said conduits to another.

6. In a motor vehicle, the combination of a chassis frame, an axle, a knuckle with associated bearings, pivoted thereon, a junction fitting fixedly positioned in respect to said knuckle near the upper part thereof, a flow line bridging from said chassis to said junction, said junction having an inlet from said bridging conduit, a plurality of conduits leading from said junction and in communication with said inlet, and leading to various knuckle bearings, means preventing siphoning from one of said conduits to another including suction seated flap valves.

7. In a motor vehicle, the combination of a chassis frame, an axle, a knuckle with associated bearings, pivoted thereon, a junction fitting fixedly positioned in respect to said knuckle near the upper part thereof, a flow line bridging from said chassis to said junction, said junction having an inlet from said bridging conduit, a plurality of conduits leading from said junction and in communication with said inlet, and leading to various knuckle bearings, the junction fitting being disposed substantially removed from and in alinement with the pivot axis of the knuckle.

8. In a motor vehicle, the combination of a chassis frame, an axle, a knuckle with associated bearings, pivoted thereon, a junction fitting fixed in respect to said knuckle near the upper part thereof, a flow line bridging from said chassis to said junction, said junction having an inlet from said bridging conduit, a plurality of conduits leading from said junction and in communication with said inlet, and leading to various knuckle bearings, the junction fitting being disposed substantially removed from and in alinement with the pivot axis of the knuckle, and having its inlet substantially facing the bridging conduit.

9. Means for lubricating steering knuckles including a supply fitting rigid with the knuckle having a reception chamber therein and a plurality of parallel-flow distributing conduits fed simultaneously from the chamber, means to effect a continuous supply of lubricant to the chamber, and means to proportion the flow through said conduits from the chamber.

10. Means for lubricating steering knuckles with associate bearings including a supply fitting rigid with the knuckle having a reception chamber therein and a plurality of parallel-flow distributing conduits fed simultaneously from the chamber, means to effect a continuous supply of lubricant to the chamber, and means to proportion the flow through said conduits from the chamber, said fitting being arranged at a level intermediate the levels of the various bearings to be supplied by said conduits, said knuckle being arranged to have pivotal bearings on a king pin and said fitting being positioned on the knuckle above said king pin bearings.

11. In a steering knuckle embodying a plurality of associated movable control appurtenances and bearings for such appurtenances, a lubricating system including a fitting rigid with the knuckle having a central reception chamber therein and a drip plug controlled means to proportionally supply in parallel a plurality of said bearings from the fitting, said knuckle being arranged to have pivotal bearings on a king pin and said fitting being positioned on the knuckle above said king pin bearings.

12. In a lubricating system for a motor vehicle of the type comprising a chassis, a supporting element connected to said chassis, a knuckle with associated bearings, pivoted thereon, means for feeding lubricant from the chassis to the various bearings on the knuckle said means comprising a lubricant dividing fitting fixedly positioned in respect to the knuckle near the upper part thereof, said fitting having a lubricant inlet and radiating lubricant outlets, a plurality of flow resistant filters in said radiating outlets and conduits carried by said knuckle and leading from the radiating outlets to knuckle bearings.

13. In a lubricating system for a motor vehicle of the type comprising a chassis, a supporting element connected to said chassis, a knuckle with associated bearings, pivoted thereon, means for feeding lubricant from the chassis to the various bearings on the knuckle said means comprising a lubricant dividing fitting fixedly positioned in respect to the knuckle near the upper part thereof, said fitting having a lubricant inlet and radiating lubricant outlets, a plurality of wick-like flow resistant filters in said radiating outlets and conduits carried by said knuckle and leading from the radiating outlets to knuckle bearings, the inlet ends of the wicks being tightly engaged with each other for simultaneous feed from the inlet.

14. In a lubricating system for a motor vehicle of the type comprising a chassis, a supporting element connected to said chassis, a knuckle with associated bearings, pivoted thereon, means for feeding lubricant from the chassis to the various bearings on the knuckle said means comprising a lubricant dividing fitting fixedly positioned in respect to the knuckle near the upper part thereof, said fitting having a lubricant inlet and radiating lubricant outlets, a plurality of flow resistant filters in said radiating outlets and conduits carried by said knuckle and leading from the radiating outlets to knuckle bearings and means for continuously supplying lubricant under a pressure consistent with its fluidity to the inlet of said fitting.

15. In a motor vehicle the combination of a chassis, a supporting element connected to said chassis, and a knuckle with associated bearings, pivoted to the latter, means for conveying lubricant under pressure from said chassis to said knuckle, said means comprising a flexible pressure conveying conduit bridging from said frame to said knuckle, a junction fitting fixedly positioned in respect to said knuckle near the upper part thereof and in substantial alignment with the knuckle pivot, and having an inlet carrrying the outlet end of said flexible conduit, drip plugs protruding from said junction fitting and in communication with said inlet, conduits leading from said drip plugs to bearings of the knuckle, and suction seated valves in some of the drip plugs.

16. Means for lubricating from a source on a main structure a plurality of bearings on a correlated relatively movable structure, said means comprising a conduit leading from said related structure and adapted to compensate for movement between said structures, a cluster of flow restriction elements on said related structure at the outlet end of said flexible conduit and distributing conduits leading from the respective restriction elements to the corresponding bearings of the related structure.

17. In a chassis lubricating system, means for conveying lubricant from a vehicle frame to a steering knuckle with associated bearings, said means comprising a yielding pressure transmitting conduit bridging from the vehicle frame to said knuckle, a cluster of flow restriction outlets fixed relatively to the knuckle and immediately contiguous to the outlet end of said conduit and a plurality of distributing conduits carried by said knuckle and leading to bearings of the knuckle.

18. In a chassis lubricating system, means for conveying lubricant from a vehicle frame to a steering knuckle with associated bearings, said means comprising a yielding pressure transmitting conduit bridging from the vehicle frame to said knuckle, a cluster of flow restriction outlets fixed relatively to the knuckle and immediately contiguous to the outlet end of said conduit and a plurality of distributing conduits carried by said knuckle and leading to the respective bearings of the knuckle, said outlets being arranged substantially adjacent to the pivot axis of the knuckle.

19. In a chassis lubricating installation, a chassis, a supporting element connected to said chassis, a steering knuckle with associated bearings, having a pivot axis on the end of said supporting element, a cluster of flow restriction elements above the pivot of said knuckle, conduits leading from the respective flow restrictions downward to various bearings of the knuckle, and a pressure conveying yielding conduit bridging from the chassis to said cluster.

20. In a chassis lubricating installation, a chassis, a supporting element connected to said chassis, a steering knuckle with associated bearings, having a pivot axis on the end of said supporting element, a cluster of flow restriction elements above the pivot of said knuckle, conduits leading from the respective flow restrictions downward to various bearings of the knuckle, and a pressure conveying yielding conduit bridging from the chassis to said cluster, and means for conveying a pressure transmitted through said conduit simultaneously to the various flow restrictions of said cluster, comprising a common chamber communicating with the bridging conduit and with all of said flow restrictions.

21. A steering knuckle with associated bearings for an automobile comprising a dividing fitting fixedly positioned in respect to said knuckle above the pivot thereof, an inlet socket therein adapted for connection with a source of pressure, a plurality of flow control elements supplied parallel from said socket, and lubricant conduits carried by said knuckle for delivering from the respective flow restrictions to various bearings of the knuckle.

22. In a vehicle of the type which includes a steering knuckle with associated bearings, having a pivot axis, the combination of a pressure chassis lubricating system therefor of the continuous feed type, comprising a source of continuous lubricant feed correlated during vehicle operation for continuous extremely slow feed therefrom under pressure, a distributing system supplied from said source and having a plurality of flow restriction outlets at various bearings on the frame, a yielding pressure transmitting conduit bridging from the vehicle frame to the knuckle, a lubricant distributing unit rigid with said knuckle having an inlet for the outlet end of said conduit and having a plurality of contiguous flow restriction elements supplied in parallel from said inlet, and conduits from the respective flow restrictions to various knuckle bearings.

23. In a vehicle of the type which includes a steering knuckle having a pivot axis, the combination of a pressure chassis lubricating system therefor of the continuous feed type, comprising a source of continuous lubricant feed correlated during vehicle operation for continuous extremely slow feed therefrom under pressure, a distributing system supplied from said source and having a plurality of flow restriction outlets at various bearings on the frame, a yielding pressure transmitting conduit bridging from the vehicle frame to the knuckle, a lubricant distributing junction rigid with said knuckle having an inlet for the outlet end of said conduit, said junction having a plurality of drip plug units in corresponding sockets therein and having a passage therein communicating from said inlet to said various drip plugs, and conduits carried by said knuckle communicating from said drip plugs to various bearings on the knuckle.

24. In a lubricating system for a motor vehicle of the type comprising a chassis, a supporting element connected to said chassis, a knuckle pivoted thereon having a plurality of associated bearings, means for feeding lubricant from the chassis to the various bearings on the knuckle, said means comprising a lubricant dividing fitting fixedly positioned in respect to the knuckle near the upper part thereof, said fitting having a lubricant inlet and lubricant outlets, a plurality of flow resistant wicks in said outlets, conduits carried by said knuckle and leading in parallel from the outlets to the respective knuckle bearings, and means for applying lubricant under pressure at the inlet of said fitting, said junction having a flap valve in certain of the outlets thereof to prevent siphoning.

25. In a lubricating system for a motor vehicle of the type comprising a chassis, a supporting element connected to said chassis, a knuckle with associated bearings, pivoted thereon, means for feeding lubricant from the chassis to the various bearings on the knuckle, said means comprising a lubricant dividing fitting fixedly positioned in respect to the knuckle near the upper part thereof, said fitting having a lubricant inlet and radiating lubricant outlets, a plurality of flow resistant wicks in said radiating outlets retained at their inner ends in engagement with each other for simultaneous feed from said inlet, conduits carried by said knuckle and leading from the radiating outlets to the respective knuckle bearings, means for applying lubricant under pressure at the inlet of said fitting, said fitting having a flap valve in each of the outlets thereof to prevent siphoning, and a flexible transmitting lubricant conduit bridging from said frame to said inlet socket and carried at its inner end thereby.

26. In a steering knuckle lubricating system for the associated bearings thereof, a junction fitting rigid with said knuckle and having an inlet and radiating outlet wicks pinched at their upper ends in said inlet, pipes extending from the respective outlets to the respective knuckle bearings to feed the drip from the tails of the wicks and means for admitting lubricant to said inlet.

27. In an axle of the type including a fixed king pin, a brake post contiguous thereto, a knuckle with associated bearings, pivoted upon said king pin, means for feeding lubricant to various bearings of said knuckle and to the bearing of said brake post, said means comprising an inlet at the upper end of said knuckle, a feeding passageway longitudinally of said king pin, a bore longitudinally of the axle web communicating at one end with said king pin bore, and at its other end with a bore in said brake post.

28. In an axle of the type including a fixed king pin, a brake post contiguous thereto, a knuckle with associated bearings, pivoted upon said king pin, means for feeding lubricant to various bearings of said knuckle and to the bearings of said brake post, said means comprising an inlet at the upper end of said knuckle, a feeding passageway longitudinally of said king pin, a bore longitudinally of the axle web communicating at one end with said king pin bore, and at its other end with a bore in said brake post, the axle bore communicating with the king pin and the brake post bores at the respective loaded sides thereof.

29. In an axle of the type including a fixed king pin, a brake post contiguous thereto, a knuckle with associated bearings pivoted upon said king pin, means for feeding lubricant to various bearings of said knuckle and to the bearing of said brake post, said means including an inlet at the upper end of said knuckle, a passageway longitudinally of said king pin, a bore longitudinally of the axle web communicating with said king pin bore, said brake post affording inlet means communicating with the other end of said bore and delivering lubricant upward along said brake post to the bearing thereof, a junction fitting rigid with said knuckle, flow controlling outlets on said junction fitting, conduits extending from the respective outlets to the various bearings of the knuckle, one of said conduits leading to the aforementioned inlet of the upper king pin bearing.

30. In a chassis lubricating system, the combination of a frame, a knuckle supporting element, and a knuckle with associated bearings, pivoted thereto of the type having a brake thereon; the combination therewith of a junction fitting affixed to the brake shield at a part thereof below said brake, a flexible pressure transmitting conduit bridging from said frame to said fitting, one of the outlets of said fitting having an upwardly extending conduit leading to said brake mechanism, means restricting the flow through said conduit, means preventing return flow through said conduit, one or more additional outlets on said junction fitting having restriction members therein and pipes extending downward from said outlets to various subjacent bearings of the knuckle.

31. In a motor vehicle comprising a frame, an axle, a steering knuckle and a brake post thereon, means for conveying lubricant to said knuckle and said post, said means comprising a common inlet and dividing fitting rigid with said knuckle at level above said king pin and said post, a conduit leading downward from the dividing fitting to said king pin and a flexible conduit leading downward from said dividing fitting to the brake post.

32. In a motor vehicle of the type comprising a king pin supported from the chassis and having a knuckle pivoted thereon and provided with one or more control bearings, a brake post, a brake shield on said knuckle and a brake cam shaft having a bearing in said shield above said king pin, means for lubricating said various bearings from a common source said means comprising a junction fitting affixed to said shield above said king pin and below said cam shaft bearing and having an inlet, a plurality of outlets communicating therewith, flow restrictions in the several outlets, pipes leading from said several restricted outlets to various bearings on said knuckle, the pipe of one such outlet extending upward to said brake shaft bearing, means associated with said various restrictions to prevent return flow therethrough, a passageway through said king pin and a connecting conduit to the bearing of said brake post to convey lubricant from the former to the latter.

33. In a motor vehicle of the type comprising a king pin affixed in the axle and having a knuckle thereon provided with plurality of control bearings, a brake post in said axle, a brake shield on said knuckle and a brake cam shaft having a bearing in said shield above said king pin, means for lubricating said various bearings from a common source said means comprising a junction fitting affixed to said shield above said king pin and below the cam shaft and having an inlet, a plurality of outlets communicating therewith, flow restrictions in the several outlets, feed pipes leading in parallel from said several restricted outlets to various bearings on said knuckle, the pipe of one such outlet extending upward to said brake shaft bearing, means associated with said various restrictions to prevent return flow therethrough, and a flexible conduit leading from one of said outlets to the upper end of said brake post.

34. In a liquid distribution system, a series of distributing conduits, a source of pressure common to said conduits, a liquid supply common to said conduits and a thermostatic spring seated valved lubricant flow controlling device also common to said conduits positioned between the source of pressure and the conduits in the path of lubricant flow permitting return flow of lubricant to said supply.

35. A liquid distribution system comprising a series of distributing conduits having a common inlet and a plurality of outlets, flow restrictions at the outlets of said conduits to proportion the distribution, a source of pressure to supply liquid to said inlet, a liquid supply to supply liquid to said source of pressure and a return from said inlet to the source of pressure, said return being provided with temperature responsive means to control the division of liquid between the return and the distribution system.

36. A lubricant distribution system comprising a lubricant supply, a source of pressure including a lubricant pump receiving lubricant from said supply, branch conduits receiving lubricant from said source of pressure and extending to points of distribution, flow controlling outlets at the points of distribution and temperature responsive automatically adjustable means to control the lubricant pressure supplied to said distribution system from said pump permitting return flow of lubricant to said supply.

37. In a chassis lubricating system, an elevated reservoir, a gear pump receiving lubricant from said reservoir, distributing lines extending to various points of said chassis requiring lubrication, a thermostatic device interposed between said gear pump and said distributing lines and a return from said thermostatic device to said gear pump.

38. In a chassis lubricating system, an elevated reservoir, a gear pump receiving lubricant from said reservoir, distributing lines extending to various points of said chassis requiring lubrication, a thermostatic device interposed between said gear pump and said distributing lines and a return from said thermostatic device to said gear pump, said thermostatic element comprising a connecting through conduit from the gear pump to the distributing lines, a shunt conduit from said through conduit leading to the return, a spring-seated valve upon said shunt conduit and a bi-metallic temperature-sensitive element to control the tension on said spring.

39. In a motor vehicle, the combination of a chassis frame, a knuckle with associated bearings pivoted thereon, a junction fitting fixedly positioned in respect to said knuckle near the upper part thereof, a flow line bridging from said chassis frame to said junction, said junction having an inlet from said bridging conduit and a plurality of conduits leading from said junction and in communication with said inlet, and leading to various knuckle bearings, said knuckle being provided with a brake shield and said fitting being fixed upon said brake shield.

40. The combination with a motor vehicle of the type having a chassis frame, and a knuckle pivoted therefrom, and carrying bearings; a lubricating installation comprising a lubricant reservoir, a continuous lubricant pump supplied from said reservoir, a conduit system upon said chassis supplied from said pump, a conduit system on said knuckle supplied from said pump, a flexible conduit connection between said conduit systems, a restricted proportioning junction arrangement rigid with said knuckle and serving as a connection between said flexible conduit and said knuckle conduit and a thermostatically controlled by-pass associated with said installation for regulating the pressure applied to said conduit systems.

41. Means for conveying lubricant from a supply to a plurality of bearings of a mechanism, said means comprising a conduit extending to said mechanism, a plurality of radiating flow control wick elements brought together in close contiguity to each other at their inlet ends and supplied from the outlet end of said conduit and additional conduits enclosing and leading from the respective flow control elements to said bearings, said wick elements being all of about the same length and being independent of each other and being maintained at about the same level.

JOSEPH BIJUR.